Figure 1:
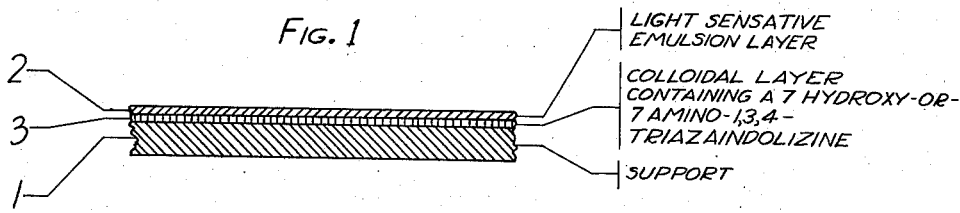

Sept. 14, 1948.  N. HEIMBACH ET AL  2,449,225
7-AMINO AND 7-HYDROXY-1,3,4-TRIAZAINDOLIZINES
AS STABILIZERS FOR PHOTOGRAPHIC
SILVER-HALIDE EMULSIONS
Filed Oct. 22, 1946

INVENTOR.
NEWTON HEIMBACH
WALTER KELLY JR.
BY
ATTORNEYS

UNITED STATES PATENT OFFICE 2,449,225

7-AMINO AND 7-HYDROXY-1,3,4-TRIAZAIN-DOLIZINES AS STABILIZERS FOR PHOTOGRAPHIC SILVER-HALIDE EMULSIONS

Newton Heimbach and Walter Kelly, Jr., Binghamton, N. Y., assignors to General Aniline & Film Corporation, New York, N. Y., a corporation of Delaware Application October 22, 1946, Serial No. 704,933

12 Claims. (Cl. 95—7)

This invention relates to the stabilizing of light-sensitive silver-halide emulsions, and more particularly to the use of reaction products obtained by the condensation of a β-keto ester with a 3-amino-5-carbalkoxy-1,2,4-triazole as stabilizers for silver-halide emulsions.

It is known in the art that light-sensitive emulsions, such as gelatin silver-halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light and yellow or red transmitted light. The so-called chemical fog, or gray fog, on the other hand, is the more common and is formed in a number of ways. It may be caused by premature exposure, by excessive ripening of the emulsions, or by the storage of the film, particularly at high temperatures or for unusually long periods of time.

The primary object of the present invention is to provide stabilizers or fog inhibiting agents which tend to prevent the formation of chemical fog in light-sensitive silver-halide emulsions.

A further object is to provide stabilizers or anti-fogging agents for light-sensitive silver-halide emulsions, which do not lower the sensitivity of the emulsion, and which increase its stability.

Still further objects and advantages will appear from the following specification.

We have found that the above objects are accomplished by the use of a reaction product obtained by the condensation of a β-keto ester with a 3-amino-5-carbalkoxy-1,2,4-triazole. The resulting condensation product is characterized by a structure corresponding to the following general formula:

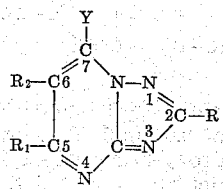

wherein R is a carboxy or carbalkoxy group, e. g., carbomethoxy, carbethoxy, carbopropoxy, and the like, R₁ is an alkyl group, e. g., methyl, ethyl, propyl, butyl, amyl, etc., aryl, e. g., phenyl, tolyl, etc., aralkyl, e. g., benzyl, etc., heterocyclic e. g., pyridyl, furyl, pyrryl, and the like, R₂ is either hydrogen, or an alkyl, aryl or aralkyl group of the same value as R₁, and Y is an amino or hydroxy group.

The method for the preparation of the 7-hydroxy-1,3,4-triazaindolizines by condensing a β-keto ester with a 3-amino-1,2,4-triazole is given in Berichte 42, 4643 and 43, pages 378–380. By substituting a 3-amino-5-carbalkoxy - 1,2,4-triazole for the 3-amino-1,2,4-triazole and employing the same reaction conditions described in these references, the hydroxy-1,3,4 - triazaindolizines utilized in accordance with this invention are readily prepared. By substituting β-imino nitriles for the β-keto ester and a 3-amino-5-carbalkoxy-1,2,4-triazole for the 3-amino-1,2,4-triazole and employing the same reaction conditions described in those references, the 7-amino-1,3,4-triazaindolizines utilized in accordance with this invention are readily prepared. The method employed consists of heating 1 mol of a β-keto ester or 1 mol of a β-imino nitrile with 1 mol of 3-amino-5-carbalkoxy-1,2,4-triazole of the following general formula:

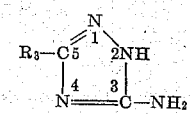

wherein R₃ is a carbalkoxy group of the same value as that referred to above in defining character R.

Suitable β-keto esters are, for example, ethyl acetoacetate, ethyl benzoylacetate, ethyl-α-ethyl acetoacetate, ethyl α-allyl acetoacetate, ethyl toluylacetate, ethyl propionylacetate, ethyl butyrylacetate, ethyl valerylacetate, ethyl nicotinoacetate, and the like.

As suitable β-imino nitriles may be mentioned, β-imino-butyronitrile, β-phenyl-β-imino-propionitrile, β-imino-α-methyl-butyronitrile, β-imino-α-phenyl-butyronitrile, and the like.

As suitable 3-amino-5-carbalkoxy - 1,2,4-triazoles may be mentioned, 3-amino-5-carbomethoxy-1,2,4-triazole, 3 - amino-5-carbethoxy-1,2,4-triazole, 3-amino-5-carbopropoxy-1,2,4 - triazole, and the like.

The condensation between the β-keto ester and the 3-amino-5-carbalkoxy-1,2,4-triazole, is carried out by heating the reaction components at a temperature ranging from 100°–120° C., preferably at reflux temperature, in the presence of an inert water-binding, solvent-diluent, such as glacial acetic acid, and the like, for a period of from 1 to 6 hours. The final product either precipitates or is removed by diluting the solvent-diluent with water, ethyl ether, acetone, or the like, and is recrystallized from alcohol, e. g., methanol, ethanol, etc., or alcohol-water mixture.

The β-keto esters and the 3-amino-5-carbalkoxy-1,2,4-triazoles are well-known to the art and the methods for their preparation need not be described herein.

Specific compounds which have been prepared in accordance with the above procedures, with their formulas, are the following:

(1) 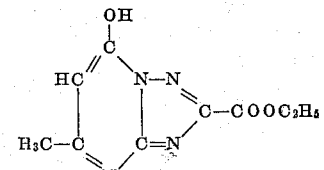

7-hydroxy-5-methyl-2-carbethoxy-1,3,4-triazaindolizine (2) 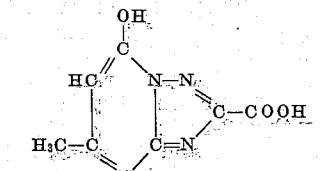

7-hydroxy-5-methyl-2-carboxy-1,3,4-triazaindolizine (3) 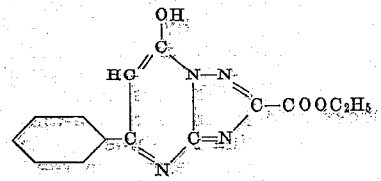

7-hydroxy-5-phenyl-2-carbethoxy-1,3,4-triazaindolizine (4) 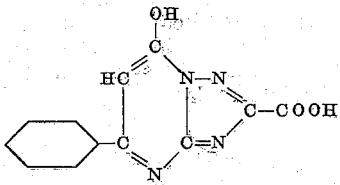

7-hydroxy-5-phenyl-2-carboxy-1,3,4-triazaindolizine (5) 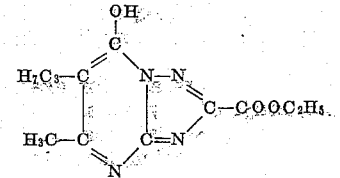

7-hydroxy-6-propyl-5-methyl-2-carbethoxy-1,3,4-triazaindolizine (6) 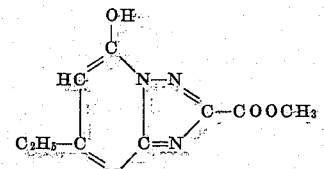

7-hydroxy-5-ethyl-2-carbomethoxy-1,3,4-triazaindolizine (7) 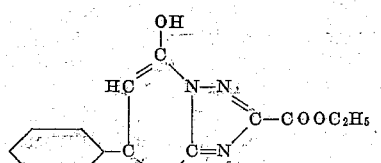

7-hydroxy-5-[2-pyridyl]-2-carbethoxy-1,3,4-triazaindolizine (8) 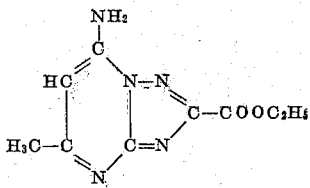

7-amino-5-methyl-2-carbethoxy-1,3,4-triazaindolizine (9) 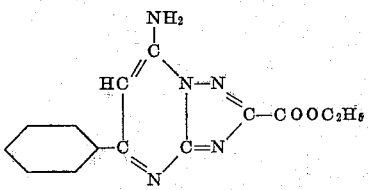

7-amino-5-phenyl-2-carbethoxy-1,3,4-triazaindolizine

(10) 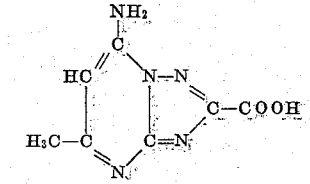

7-amino-5-methyl-2-carboxy-1,3,4-triazaindolizine

(11) 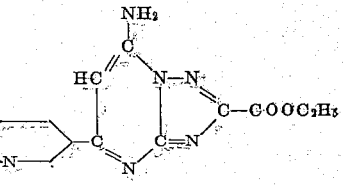

7-amino-5-[2-pyridyl]-2-carbethoxy-1,3,4-triazaindolizine

The following examples are intended to illustrate the preparation of the compounds disclosed above.

Example I

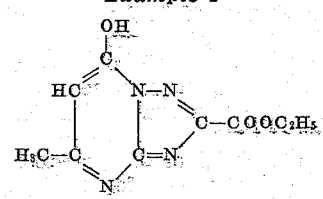

7-hydroxy-5-methyl-2-carbethoxy-1,3,4-triazaindolizine

A solution of 0.02 mol (3.12 grams) of 3-amino-5-carbethoxy-1,2,4-triazole and 0.02 mol (2.60 grams) of ethyl acetoacetate in 20 cc. of glacial acetic acid was refluxed for 6 hours. After cooling, the reaction mixture was diluted with water and the white precipitated product removed by filtration. Purification was effected by recrystallization from 300 cc. of boiling water. The product crystallized as white prisms.

Example II

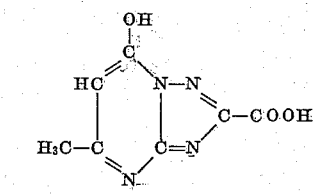

7-hydroxy-5-methyl-2-carboxy-1,3,4-triazaindolizine

A solution of 0.01 mol (2.22 grams) of 2-carbethoxy-7-hydroxy-5-methyl-1,3,4-triazaindolizine in 0.05 mol (10 cc.) of 5 N NaOH and 40 cc. of water was refluxed for 1 hour. After cooling, the reaction mixture was acidified with hydrochloric acid, and the precipitated carboxy indolizine was filtered and recrystallized in the

Example III

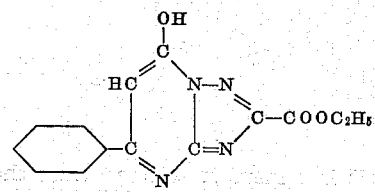

7-hydroxy-5-phenyl-2-carbethoxy-1,3,4-triazaindolizine

Example I was repeated with the exception that an equivalent quantity of ethyl benzoylacetate was substituted for ethyl acetoacetate.

In the preparation of an emulsion containing the stabilizers used according to our invention, a solution of the stabilizer in a suitable solvent, such as alcohol or an alcohol-water mixture, adjusted to a neutral or slightly alkaline pH, i. e., pH 7 to 10, is made up and the solution mixed with the emulsion at any point during its preparation, but preferably during ripening or just prior to coating in concentrations varying from 25 mg. to 500 mg. per liter of emulsion. The actual concentration employed will depend upon the type of emulsion used and varies slightly with the compound used.

The method of testing the stabilizers in the following examples consists of coating two film strips, such as cellulose acetate, with the same emulsion, one with and one without stabilizer, storing the emulsions in an incubator for six days at 50° C., then exposing, developing, fixing, and washing the same under standard conditions. The fog density or blackening produced in the unexposed areas in the two emulsions is then measured in a transmission densitometer of standard type.

The following examples will serve to illustrate certain ways in which the stabilizers of our invention have been applied, but are not to be construed as limiting the invention.

Example IV

A photographic film coated with an ordinary gelatin bromoiodide emulsion of normal speed and contrast on development under standard conditions, after incubation for 6 days at 50° C., gave a fog of 0.28 density. Another film coated with the same emulsion containing an addition of 250 mg. of the compound of Example I per 1000 cc. of emulsion equivalent to about 50 grams of silver nitrate and developed under the same conditions, after the same incubation, gave a fog of only 0.08 density.

Example V

Example IV was repeated with the exception that an equivalent quantity of the compound of Example II was substituted for the compound of Example I. The results obtained were almost identical with those obtained in Example IV.

Example VI

Example IV was again repeated with the exception that an equivalent quantity of the compound of Example III was substituted for the compound of Example I. After incubation and development, the emulsion containing the compound of Example III gave a fog of 0.1.

Further experiments have shown that emulsions containing stabilizers in accordance with our invention have not only improved keeping qualities (i. e., a reduction in the fog produced by incubation or by long storage) but in addition show little or no loss in speed to which some emulsions are susceptible.

The stabilizers, which we have described and employed, may be used in various kinds of emulsions. In addition to being useful in orthochromatic and panchromatic emulsions, they may also be used in non-sensitized emulsions and X-ray emulsions. If used with sensitizing dyes they may be added to the emulsion before or after the dyes are added. The dispersing agents for the silver-halides may be gelatin or other colloid such as water-soluble cellulose derivatives, e. g., hydroxy ethyl cellulose, methyl cellulose, carboxy-oxy-cellulose, low acetyl value cellulose acetate, polyvinyl alcohol, and the like. The stabilizers may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives e. g., cellulose nitrate, cellulose acetate, and the lower fatty acid esters of cellulose including simple and mixed esters and ethers of cellulose, and the like, as an under or overcoat for the emulsion or as a backing layer for the support. Moreover, they may be incorporated in the support for the sensitive emulsion layer or in an intermediate layer between the sensitive emulsion layer and the support, such as the baryta coating commonly used in photographic papers, or they may be incorporated in a protective layer coated upon the emulsion surface. Furthermore, the otherwise finished photographic material may be bathed in an alcohol or alcohol-water solution containing the stabilizer.

In the accompanying drawing the various figures are enlarged section views of photographic materials having anti-fogging layers made according to our invention.

As shown in Figure 1, the support 1, which may be of any suitable material such as glass, cellulose ester, synthetic resin, or paper, is provided with an anti-fogging layer 3, containing one of said amino- or hydroxy-1,3,4-triazaindolizines referred to above. The light-sensitive emulsion layer 2 is attached to the anti-fogging layer 3.

Figure 2:
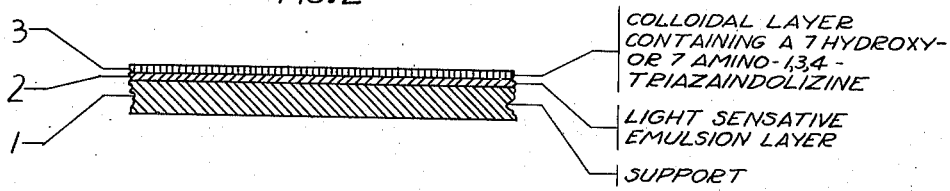

Figure 2 illustrates a similar material in which the support 1 is coated with a light-sensitive emulsion layer 2, and on the latter side there is provided an anti-fogging layer 3, containing one of said amino- or hydroxy-1,3,4-triazaindolizines.

Figure 3:
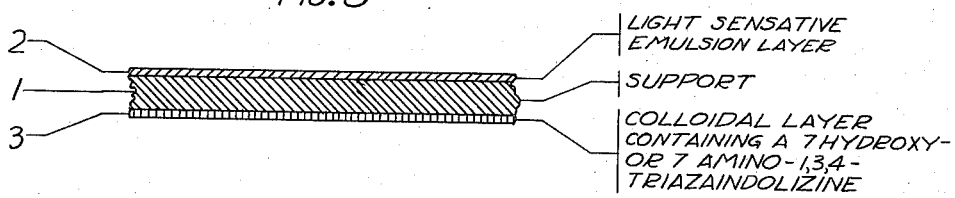

Figure 3 illustrates a film or plate of which the support 1 bears on one side the light-sensitive emulsion layer 2, and on the other side an anti-fogging layer 3, containing such amino- or hydroxy-1,3,4-triazaindolizines.

Figure 4:
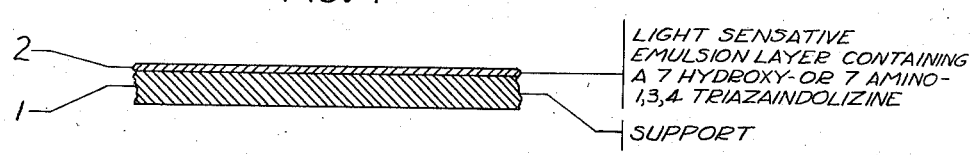

Figure 4 illustrates a film, plate, or paper of which the support 1 is provided with the light-sensitive emulsion layer 2, containing as an anti-fogging layer amino- or hydroxy-1,3,4-triazaindolizines.

Since the presence of these new compounds tends to prevent chemical fog whether they are incorporated directly into the emulsion, added to a separate surface or substratum layer, it is understood that the term "photographic material" as employed herein and in the appended claims, is used in a generic sense to include each of these possible applications.

Various modifications of this invention will occur to persons skilled in the art and it is, therefore, understood that the patent granted shall only be limited by the appended claims.

We claim:

1. A photographic material comprising a base and a light-sensitive silver-halide emulsion carried thereby, said photographic material containing, in fog inhibiting amount, a compound of the general formula:

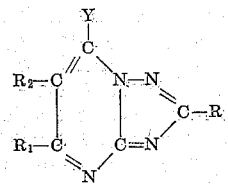

wherein R is a member selected from the class consisting of carboxy and carbalkoxy groups, $R_1$ is a member selected from the class consisting of an alkyl, aryl, and heterocyclic groups, $R_2$ is a member selected from the class consisting of hydrogen, alkyl, and aryl groups, and Y represents the member selected from the class consisting of amino and hydroxy groups.

2. A photographic material comprising a base and a light-sensitive silver-halide emulsion carried thereby, said photographic material containing, in fog inhibiting amount, a compound of the formula:

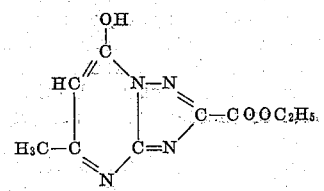

3. A photographic material comprising a base and a light-sensitive silver-halide emulsion carried thereby, said photographic material containing, in fog inhibiting amount, a compound of the formula:

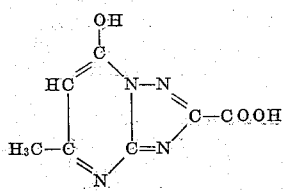

4. A photographic material comprising a base and a light-sensitive silver-halide emulsion carried thereby, said photographic material containing in fog inhibiting amount, a compound of the formula:

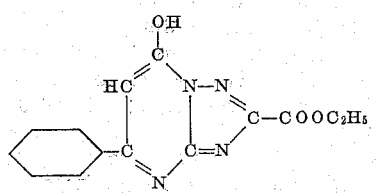

5. A photographic material comprising a base and a light-sensitive silver-halide emulsion containing, in fog inhibiting amount, a compound of the general formula:

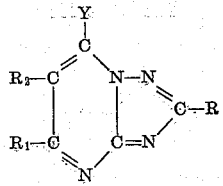

wherein R is a member selected from the class consisting of carboxy and carbalkoxy groups, $R_1$ is a member selected from the class consisting of an alkyl, aryl, and heterocyclic groups, $R_2$ is a member selected from the class consisting of hydrogen, alkyl, and aryl groups, and Y represents the member selected from the class consisting of amino and hydroxy groups.

6. A photographic material comprising a base and a light-sensitive silver-halide emulsion containing, in fog inhibiting amount, a compound of the formula:

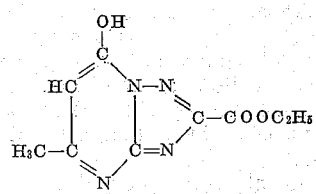

7. A photographic material comprising a base and a light-sensitive silver-halide emulsion containing, in fog inhibiting amount, a compound of the formula:

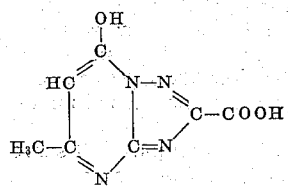

8. A photographic material comprising a base and a light-sensitive silver-halide emulsion containing, in fog inhibiting amount, a compound of the formula:

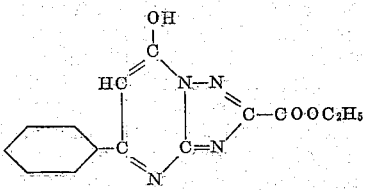

9. A photographic gelatino silver-halide emulsion containing from about 25 mg. to about 500 mg. per liter of emulsion of a compound of the general formula:

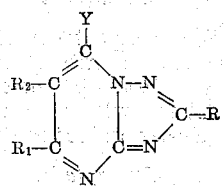

wherein R is a member selected from the class consisting of carboxy and carbalkoxy groups, $R_1$ is a member selected from the class consisting of an alkyl, aryl, and heterocyclic groups, $R_2$ is a member selected from the class consisting of hydrogen, alkyl and aryl groups, and Y represents the member selected from the class consisting of amino and hydroxy groups.

10. A photographic gelatino silver-halide emulsion containing from about 25 mg. to about 500 mg. per liter of emulsion of a compound of the formula:

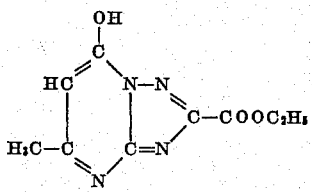

11. A photographic gelatino silver-halide emulsion containing from about 25 mg. to about 500 mg. per liter of emulsion of a compound of the formula:

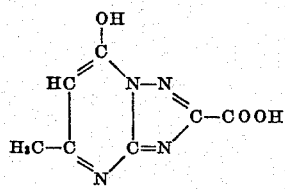

12. A photographic gelatino silver-halide emulsion containing from about 25 mg. to about 500 mg. per liter of emulsion of a compound of the formula:

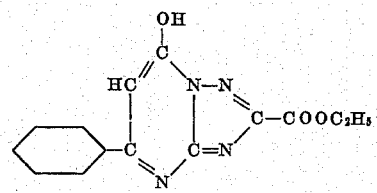

NEWTON HEIMBACH.
WALTER KELLY, Jr.

REFERENCES CITED

The following references are of record in the file of this patent:

UNITED STATES PATENTS

| Number | Name | Date |
|---|---|---|
| 2,390,707 | Heimbach | Dec. 11, 1945 |